(12) United States Patent
Felton et al.

(10) Patent No.: US 8,769,307 B2
(45) Date of Patent: Jul. 1, 2014

(54) SECURE OPERATION INDICATOR

(75) Inventors: Donald Felton, Ely (GB); James I McNiven, Ely (GB)

(73) Assignee: ARM Limited, Cambridge (GB)

( * ) Notice: Subject to any disclaimer, the term of this patent is extended or adjusted under 35 U.S.C. 154(b) by 2983 days.

(21) Appl. No.: 11/141,689

(22) Filed: Jun. 1, 2005

(65) Prior Publication Data

US 2006/0020826 A1 Jan. 26, 2006

(30) Foreign Application Priority Data

Jun. 11, 2004 (EP) .................................... 04253503

(51) Int. Cl.
*G06F 11/30* (2006.01)
(52) U.S. Cl.
USPC ........................................................ 713/193
(58) Field of Classification Search
USPC ........................................................ 713/193
See application file for complete search history.

(56) References Cited

U.S. PATENT DOCUMENTS

| | | | |
|---|---|---|---|
| 6,209,104 B1* | 3/2001 | Jalili | 726/18 |
| 7,302,585 B1* | 11/2007 | Proudler et al. | 713/189 |
| 2002/0087479 A1* | 7/2002 | Malcolm | 705/64 |
| 2003/0076336 A1 | 4/2003 | Fukao et al. | |
| 2003/0120957 A1 | 6/2003 | Pathiyal | |
| 2003/0159042 A1* | 8/2003 | Steinberg | 713/172 |
| 2005/0166044 A1* | 7/2005 | Kanai et al. | 713/157 |
| 2005/0166057 A1* | 7/2005 | Kanai et al. | 713/176 |
| 2005/0203855 A1* | 9/2005 | Malcolm | 705/64 |
| 2005/0268095 A1 | 12/2005 | O'Connor | |
| 2006/0069926 A1 | 3/2006 | Ginter et al. | |
| 2006/0090084 A1 | 4/2006 | Buer | |
| 2006/0195907 A1 | 8/2006 | Delfs et al. | |
| 2006/0223637 A1 | 10/2006 | Rosenberg | |
| 2007/0044146 A1* | 2/2007 | Murase et al. | 726/10 |
| 2007/0234069 A1 | 10/2007 | Ginter et al. | |
| 2008/0005794 A1 | 1/2008 | Inoue et al. | |

FOREIGN PATENT DOCUMENTS

| | | |
|---|---|---|
| EP | 1 056 014 | 11/2000 |
| WO | 02/31631 | 4/2002 |

OTHER PUBLICATIONS

International Search Report for EP 04 25 3503 dated Nov. 16, 2004.
"Yahoo Photos Photos Help," Apr. 13, 2001, XP-002247402, 27 pages.
Peterson, et al., *A Graphical Method for Determining the Logged on User*, vol. 24, Mar. 1995, Motorola Technical Developments, Schaumburg, IL, pp. 20-21.
Office Action mailed Sep. 26, 2012 in co-pending U.S. Appl. No. 12/923,935.
Office Action mailed Feb. 10, 2012 in co-pending U.S. Appl. No. 12/923,935.

* cited by examiner

*Primary Examiner* — Teshome Hailu
(74) *Attorney, Agent, or Firm* — Nixon & Vanderhye P.C.

(57) ABSTRACT

A data processing apparatus and a method of indicating operation of a data processor within a secure domain. The apparatus comprising a display for displaying data; a processor operable in a secure domain, said processor when operating in said secure domain having access to a user specific image; wherein said processor is operable to indicate operation within said secure domain by displaying said user specific image on at least a portion of said display when operating within said secure domain.

7 Claims, 5 Drawing Sheets

SECURE OPERATION INDICATOR

BACKGROUND OF THE INVENTION

1. Field of the Invention

The present invention relates to the field of secure user interfaces.

This application claims priority to European Application 04253503.9, filed 11 Jun. 2004, the entire content of which is hereby incorporated by reference.

2. Description of the Prior Art

The provision of secure zones within processors, such that a user is able to work with confidential data with some degree of assurance that this data cannot be accessed by an unauthorised person is known. There are a number of different secure systems which each seek to provide protected access to data. One problem with such systems is how to indicate to the user that a display area is trustworthy, i.e. that the processor is operating within a secure zone, such that a user can be confident that the displayed data is data from the secure system and not from the normal space applications and that any data that he enters will not be accessible to others.

One way of addressing this problem is to provide a particular icon, such as a padlock, which can be displayed on a generic screen space during secure operation and thereby provide an indication to the user that the processor is operating within a secure domain. One disadvantage of such a system is that it is not difficult for an application trying to mimic the secure system to display such an icon. Thus, the user could be led to believe that he was operating within a secure state when he was not.

An alternative more secure option would be to use the support of secure hardware to drive a dedicated screen space. A disadvantage with this is that for applications such as mobile phones, the current phone LCD space is of such value that it is not desirable to dedicate any for a particular task such as secure indication.

Another option would be to provide a dedicated external indicator such as an LED that would indicate that the whole display area is in some form of secure mode. This is also felt to be too expensive by the phone manufacturers.

SUMMARY OF THE INVENTION

A first aspect of the present invention provides an apparatus for processing data comprising: a display for displaying data a processor operable in a secure domain; wherein said processor is operable within said secure domain to generate a user specific image; said processor is operable to access said user specific image only from within said secure domain; and said processor is operable to indicate operation within said secure domain by displaying said user specific image on at least a portion of said display.

The present invention addresses the problem of providing a reliable indication to a user that they are operating within a secure domain, by providing an image that is specific to a user and can be displayed on at least a portion of the screen, the image being accessible from the secure domain. As the image is generated in the secure domain and is only accessible from there, a person without access to the secure domain cannot gain access to the image and thus, the presence of the image is a good indication of security. Furthermore, a picture may itself be inherently difficult to imitate, thus, even were someone to see the image on the screen it would not be easy to reproduce it. A further point is that it can be displayed on the generic screen or a portion of the generic screen and thus, does not require dedicated hardware or a dedicated portion of the screen.

In some embodiments, said processor is operable in a plurality of domains comprising a secure domain and a non-secure domain, said processor when operating in said secure domain having access to at least one data item which is not accessible to said processor when operating in said non-secure domain, said user specific image comprising one of said at least one data item.

Embodiments of the present invention can be used to indicate operation within a secure domain of a processor that can operate in both secure and non-secure mode. With such a processor it may be important for the user to be aware when they are switching from one domain to another.

Preferably said apparatus comprises a memory, at least a portion of said memory not being accessible from said non secure domain, said user specific image being stored in said portion of said memory not accessible from said non secure domain.

A secure memory within the apparatus is a convenient way of storing an image in a secure way. As the image is stored locally, and within the secure domain, it is hard for any unauthorised person to access it. Local storage also makes it convenient to access and display the image.

Preferably, said user specific image comprises an image generated by a user.

Although the user specific image can be generated or selected in a number of ways, a particularly advantageous way is for the user to generate the image himself. An image generated by the user will generally be unique to the user, and will probably be easier for the user to remember and correctly identify. It is also particularly difficult for others to imitate.

In some embodiments, said user specific image comprises a dynamic image comprising a plurality of images shown consecutively.

A dynamic image is particularly difficult to imitate and a user may prefer such an image.

In preferred embodiments, said apparatus further comprises a camera and camera driving software, said camera and camera driving software being arranged such that operation of the camera occurs within said secure domain, said user specific image comprising a photo taking by said camera.

A picture taken by a camera located within the data processing apparatus is a convenient way of producing a picture that it would be very hard to imitate and is specific to a particular user. Furthermore, arranging the camera and camera driving software such that operation of the camera occurs within the secure domain means that when a picture is to be taken for use as a secure domain indicator all operations concerning the taking and storing of the picture occur within the secure domain. Thus, the picture data need never be accessible from the non-secure domain of the processor.

In some embodiments, said dynamic image comprises a video clip.

An alternative to a still picture could be a video clip. This can also be specific to a user and would be easy for the user to remember and be very hard to imitate.

In some embodiments, said apparatus is operable to receive signals from, and send signals to, a remote server, said apparatus being operable to receive said user specific image from said remote server over a secure link.

In some embodiments the user specific image is received from a remote server across a secure link. This may have a particular application where security is particularly important when talking to remote processors, or where a device can have a plurality of users. In some embodiments the user specific image is stored on the server itself, whilst in other embodiments it will be received from the server and then stored on the apparatus. In some cases it may be advantageous to store the image on a server rather than on the data processing apparatus itself. This may increase security in circumstances where a number of different users have access to the apparatus. In such cases the image may originally have been sent from the apparatus to the server and may be a photo taken by the data processing device (if it has a camera).

In some embodiments, said user specific image comprises a picture fabricated by a user in conjunction with said remote server.

If it is not desirable to use a photo as the user specific image, for example, if the data processing apparatus does not possess a camera, then it may be possible for the user to produce an image in conjunction with a remote server. A server having image generation logic can be used, such that the user communicates with the server and generates an image that is unique to himself and is therefore easy to recognise and not easy to duplicate.

In some embodiments, said user specific image comprises an image received over said secure link from said remote server where it is stored, said processor being operable to indicate operation within said secure domain and connection to said remote server by display of said image.

Storage of the user specific image on a particular server, means that its display can indicate not only operation within the secure domain but also connection to that particular server. This can be important where the server is a trustworthy server such as a bank server and it is important to be sure that it is really that server that you are talking to before any confidential information is input.

Preferably, said apparatus is operable to display said user specific image as a background image on at least a portion of said display.

Although the user specific image can be displayed anywhere on the screen, it is advantageous to display it as a background image and thus no portion of the screen is dedicated to its display and the screen can be used to display data in the normal manner. This is particularly advantageous in some embodiments where screen space is at a premium.

Preferably, said apparatus comprises a mobile telephone.

Embodiments of this invention are particularly applicable to mobile telephones where screen space is at a premium and where security is often an issue.

In alternative embodiments, said apparatus comprises a personal computer.

Personal computers may handle secure data, for example, when sending credit card details to a server. In such situations it is important for the user to know that the connection is secure and this is a particularly effective way of notifying the user that the connection is indeed secure and that data can be entered safely.

In some embodiments, said apparatus comprises a data processing apparatus operable to service a plurality of users, said apparatus having access to a plurality of user specific images when operating in said secure domain, each of said plurality of user specific images corresponding to a different one of said plurality of users, said processor being operable to identify a present user and to indicate operation within said secure domain by displaying one of said plurality of user specific images corresponding to said present user on at least a portion of said display when operating within said secure domain.

An apparatus that services a plurality of users can still indicate operation within the secure domain using users specific images. By having a different image for each user that is specific to the user himself, the use of a generic security indicating image that could be obtained by someone else, is possibly easier to copy, and less easy for an individual user to remember is avoided.

In some embodiments, said apparatus is operable in a secure domain, said apparatus being operable to display said one of said plurality of images corresponding to said present user on detection of said present user and before said present user inputs any confidential data.

The ability for apparatus operating in a secure domain and having a plurality of users to display a user specific image on detection of the user, enables a user using such a device to be reassured that the device has access to the secure domain where the image is stored and as such is operating in the secure domain and before having to enter data.

A second aspect of the present invention provides a server operable to receive information from a data processing apparatus according to a first aspect of the present invention, said server being operable to store a plurality of images specific to a plurality of users, and being operable in response to a signal received from said data processing apparatus to identify said user of said remote processing device and in response to identification of said user, to encrypt one of said plurality of images specific to said user and to send said encrypted image to said remote data processing apparatus.

The storage by a server of a plurality of user specific images, enables a user to be confident that the server that he has contacted is indeed the server that he was hoping to contact. This can be important in situations where the server is a trustworthy server such as that of a bank and where important confidential details are to be input by the user. The sending of these images to the user in an encrypted form makes it difficult for a third party to intercept and then imitate the images.

In some embodiments, said server is operable to identify said user by identifying said remote processing device.

Some devices such as mobile telephones are for the most part used by one individual and thus, identifying the device may be a convenient way of identifying the user. It may be that a user uses a number of different devices and thus, one user and their corresponding user specific image may be identified by the server by identifying any one of a plurality of remote processing devices.

In some embodiments said server comprises image generation logic, operable to generate an image from a plurality of stored images in response to instructions received from a user, at least one of said plurality of user specific images being generated from said image generation logic.

An image generated by a user is generally more memorable to the user and more difficult to imitate. Providing image generation logic within a server such that a user can generate a unique image enables a remote processing device to generate an image by accessing the server, without the need for the device to comprise such logic itself.

A third aspect of the present invention provides a system comprising a server according to a second aspect of the present invention and an apparatus according to a first aspect of the present invention, said server and said apparatus being operable to transmit data to each other over a secure network.

A fourth aspect of the present invention provides a method of indicating operation of a data processor within a secure domain, comprising the following steps: generating a user specific image within said secure domain; accessing said user specific image while operating within said secure domain; displaying said user specific image on at least a portion of a display while processing data within said secure domain to indicate operation within said secure domain.

A fifth aspect of the present invention provides a method of indicating to a data processing apparatus operation within a secure domain and connection to a predetermined server, comprising: receiving a signal from said data processing apparatus at said predetermined server; identifying a user of said data processing apparatus from said received signal; encrypting a user specific image corresponding to said identified user and stored on said predetermined server; transmitting said encrypted image to said data processing apparatus.

A sixth aspect of the present invention provides a computer program product which is operable when run on a data processor to control the data processor to perform the steps of the method according to a fourth aspect of the present invention.

A seventh aspect of the present invention provides a computer program product which is operable when run on a server to control the server to perform the steps of the method according to a fifth aspect of the present invention.

The present invention will be described further, by way of example only, with reference to preferred embodiments thereof as illustrated in the accompanying drawings, in which:

DESCRIPTION OF THE PREFERRED EMBODIMENTS

Figure 1:
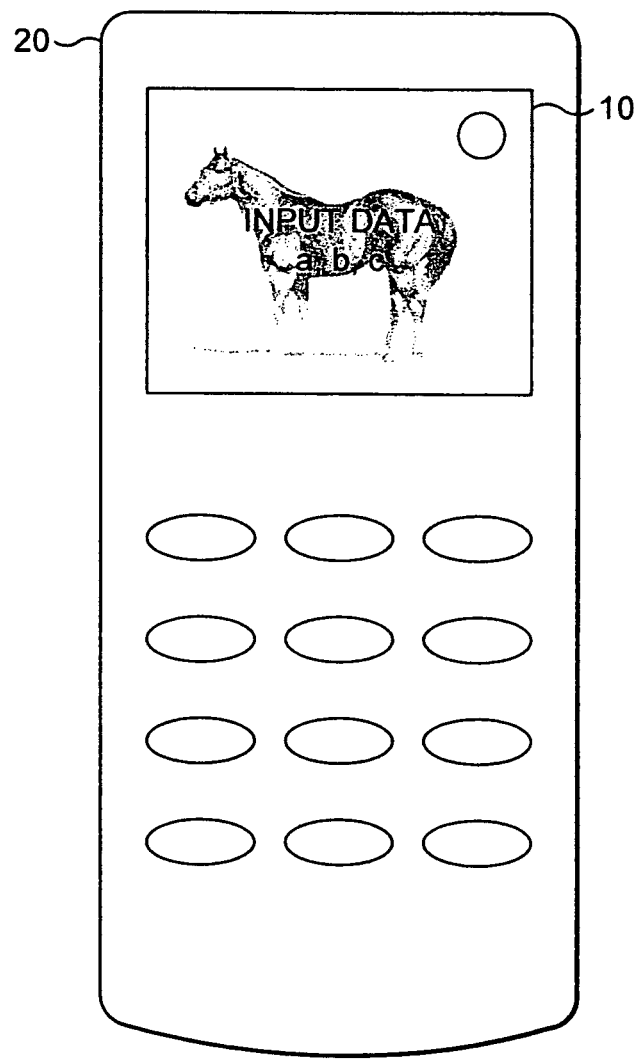
FIG. 1, shows a display screen of a mobile telephone operating in secure mode according to an embodiment of the present invention.

FIG. 1 shows a mobile phone 20 having a screen 10. In the Figure, the screen has a picture of a horse as a background image to the screen. This picture indicates to the owner of the phone that secure mode is in operation and that any data he sends or receives is safe from unauthorised access. The picture that is shown is specific to the user/owner of the phone and may be a photo taken by the phone owner with the phone camera and as such is unique to the owner of the phone and is easily recognisable by them. The picture may also be some other picture generated by the user and specific to him. The advantage of using a picture that is specific to the user and is stored in a secure domain is that pictures are hard to imitate and the user can recognise immediately his picture and be reassured that the secure domain is in operation. Generally, a phone belongs to an individual and as such the phone stores a single picture for indicating a secure domain. However, in some embodiments, it may be appropriate for a plurality of pictures specific to a plurality of users to be stored. In such circumstances, the phone would identify the user and display the appropriate picture as an indication of secure domain operation. In some embodiments, rather than a single photo taken by the user, a video clip specific to the user may be used.

Figure 2:
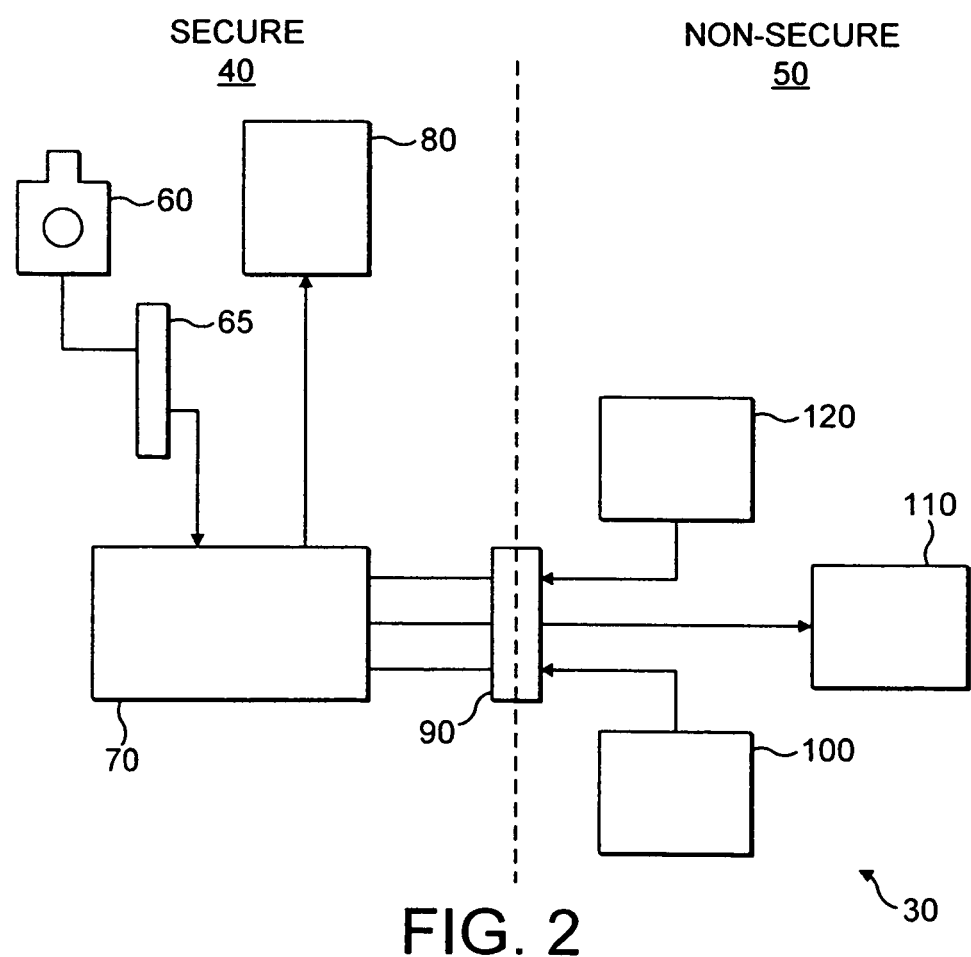
FIG. 2 schematically shows a data processing apparatus with a camera according to an embodiment of the present invention.

FIG. 2 shows a data processing apparatus 30 having a secure domain 40 and a non-secure domain 50. The data processing apparatus comprises a camera 60 within the secure domain 40. The camera 60 has hardware 65 associated with it and a software driver 70. All of these are located within the secure domain. There is also a secure memory 80 within the secure domain.

An interface 90 allows controlled communication between the non-secure domain 50 and the secure domain 40. The non-secure domain has a photographic application 100 operable to request the camera to take general non-secure photos. Instructions from the application 100 are routed through interface 90 and any photos taken in response to these instructions are sent back via interface 90 and are stored in non-secure memory 110.

The non-secure domain also comprises a separate software section 120 operable to initiate taking of a secure picture. In response to a command to initiate taking of this secure picture from section 120, the interface 90 routes the instruction to the software camera driver. This controls camera 60 to take a picture, which is then stored within a secure memory 80. Thus, a photo can be taken by camera 60 and stored within secure memory 80 without the picture ever being accessible to the non secure domain. This picture can then be used as background to the display to indicate operation within the secure domain. Thus, a picture that provides an indication of operation within the secure domain, that has been generated and stored within the secure domain and is never accessible to the non secure domain of the processor can be produced. This means that access to this picture by an unauthorised third party is avoided or at least inhibited.

Figure 3:
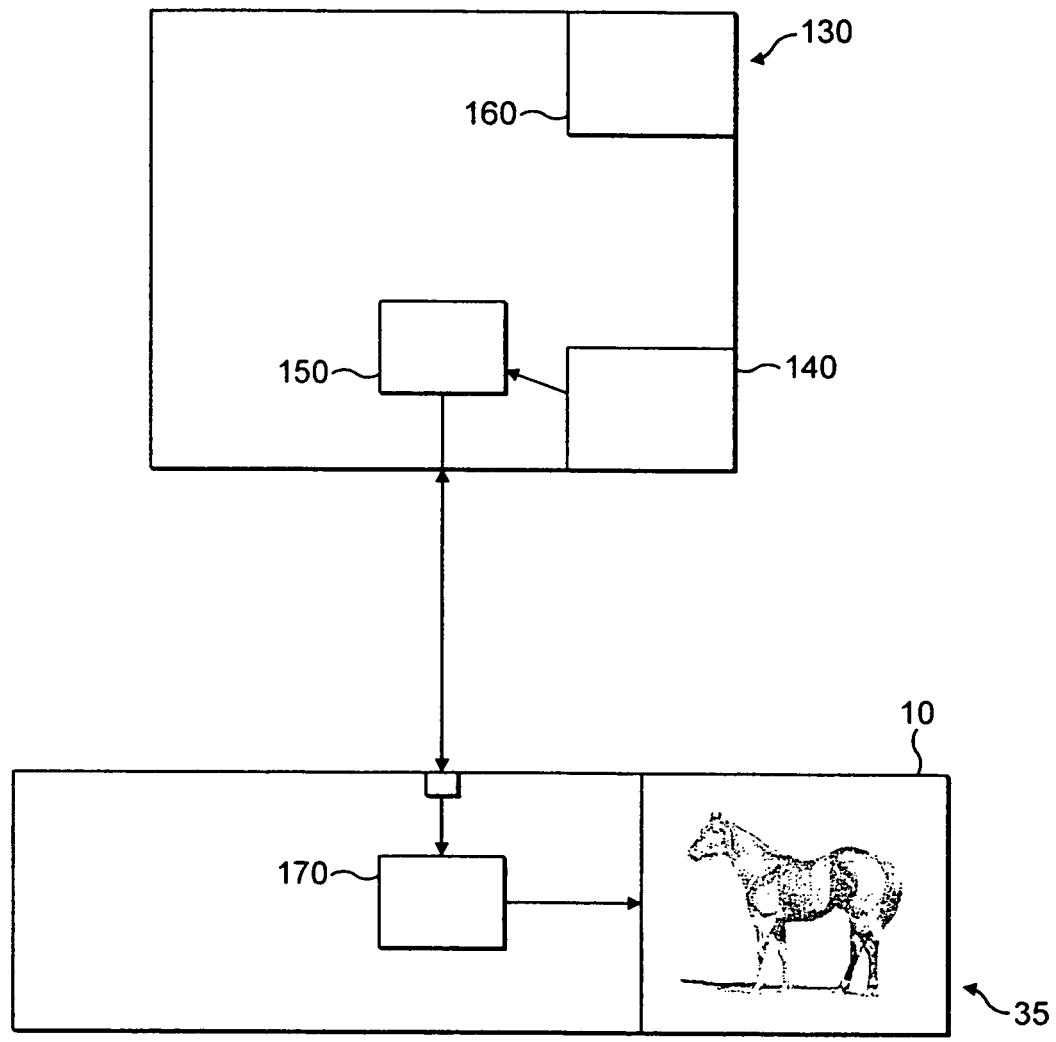
FIG. 3 schematically shows a personal computer in communication with a remote server according to an embodiment of the present invention.

FIG. 3 shows a server 130, having a data storage area 140 and encryption logic 150. The server 130 is operable to store user specific image data in data storage area 140. Each image has information associated with it identifying the user that it belongs to. This may be information relating to an actual individual user or it may relate to a code identifying a device such as a phone or a personal computer, where that device is generally used by a single individual. It may also be that a single user communicates with a particular server via a plurality of devices. The server would then identify that user in response to detection of any one of the plurality of devices and/or possibly further identifying data if one of the device were used by a plurality of users and would display the image specific to that user. In such a situation the user specific image might be a photo taken by one of the devices. When a remote data processing device 35 such as a personal computer contacts the server 130, the server identifies the user and/or device, finds the user specific image stored in memory 140, encrypts it and sends it to the device 35. Device 35 can then decrypt the image using decryption logic 170 and display the decrypted image as a background image on screen 10.

The server of FIG. 3 also has image generation logic 160. This image generation logic comprises a store of images and logic operable to cut, paste and superimpose portions of the stored images onto each other to form a new image. In some situations the image generation logic is able to produce dynamic images consisting of a plurality of user generated images shown in a sequence, such as an animation sequence. Thus, a user of remote device 35 can contact the server and can use the image generation logic to generate an image specific to that user. The image can then be stored in memory 140 for retrieval by the server to send to the remote processing device. Memory 140 can also store user specific images generated in some other way and sent to the server, either from the remote data processing device 30 itself or by another remote device.

In other embodiments, the image generation logic 160 can be used to generate an image in conjunction with a remote processing device 35 and this image can then be transmitted to device 35 and stored locally within a secure memory in device 35. In these embodiments the server is not used to store the images, rather it is used to generate them and they are then stored locally on the remote device 35, for retrieval by this device when it is operating in its secure domain.

Figure 4:
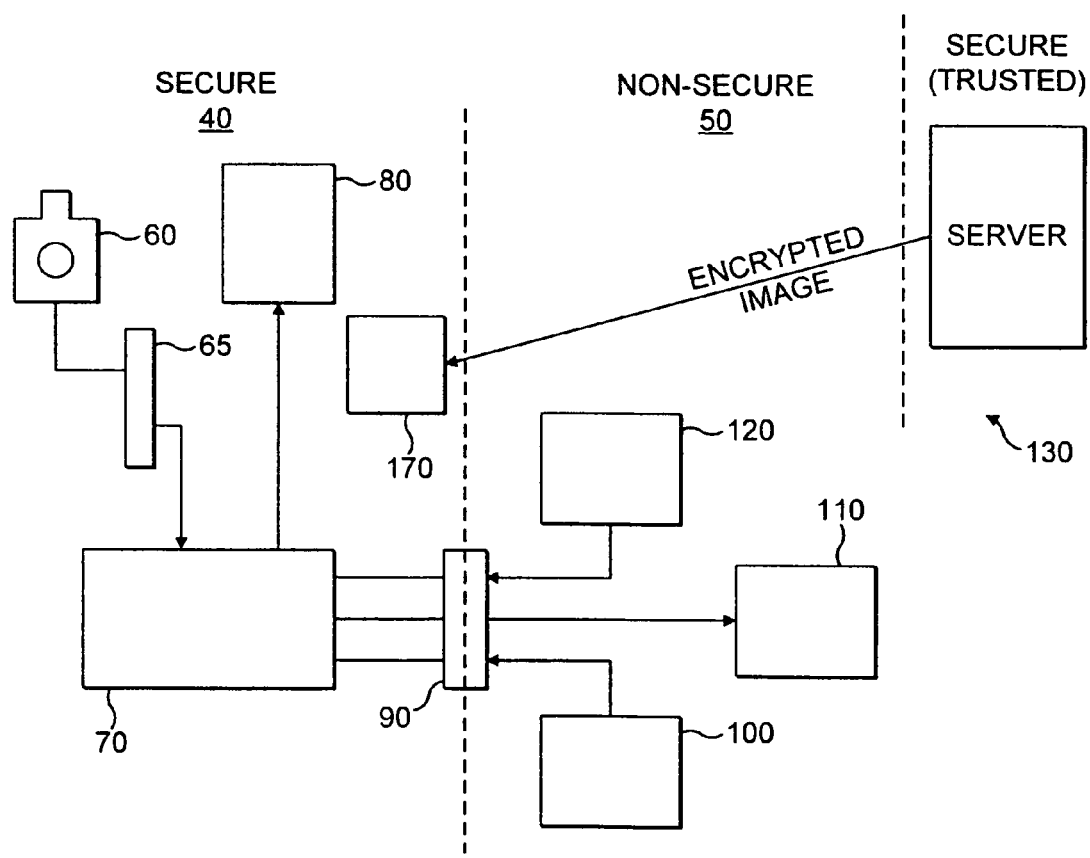
FIG. 4 schematically shows the data processing apparatus of FIG. 2 communicating via a secure link with a server.

FIG. 4 shows a server 130 communicating with the data processing apparatus of FIG. 2. As can be seen the image passes through the non-secure portion of device 30 only in encrypted form and is received by decryption logic 170 located within the secure domain. Thus, although the image may be stored or generated remotely, it is not accessible except from within the secure domain of the data processing apparatus, from within the server, or in encrypted form. This is obviously only satisfactory if the server is a trustworthy server. In such a case the unencrypted image is only accessible from within the trustworthy server or from within the trustworthy secure domain of the data processing apparatus.

Figure 5:
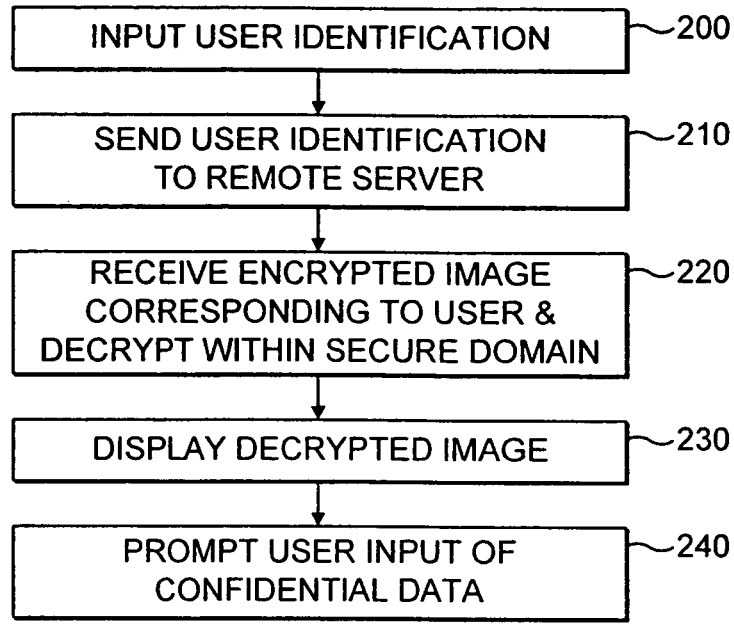
FIG. 5 is a flow diagram showing how a data processing apparatus receives an image specific to a present user.
Figure 6:
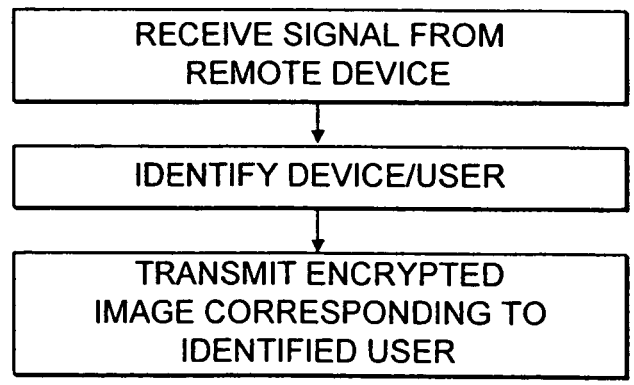
FIG. 6 is a flow diagram showing how a server sends user specific images to a remote processor.

FIGS. 5 and 6 show flow diagrams indicating how information stored on a server, such as server 130 of FIG. 3 can be used to provide a secure user interface that a user can be confident is not an imitation. This could be used in circumstances such as with bank autotellers.

FIG. 5 shows actions occurring at the remote device such as at an auto teller at a bank. A user inputs their card 200 to the machine, and the machine sends information from the card identifying the user to the server 210. The machine then receives an encrypted image from the server and it decrypts this image within a secure domain, (in the case of a bank autoteller all of its operations are within a secure domain). The decrypted image is then displayed as a background and the user can be sure that the machine is a bona fide machine and has not been tampered with and can with safety input data such as their PIN code.

FIG. 6 shows the actions occurring at the server. The server receives a signal from a remote device. It identifies the device and/or the user from the signal and then it encrypts the stored image corresponding to that user/device and transmits it to the device.

Although particular embodiments have been described herein, it will be appreciated that the invention is not limited thereto and that many modifications and additions thereto may be made within the scope of the invention. For example, various combinations of the features of the following dependent claims can be made with the features of the independent claims without departing from the scope of the present invention.

We claim:

1. An apparatus for processing data comprising:
a display for displaying data
a processor operating in a secure domain; wherein
said processor is configured within said secure domain to generate a user specific image;
said processor is configured to access said user specific image only from said secure domain; and
said processor is configured to indicate operation within said secure domain by displaying said user specific image on at least a portion of said display;
said apparatus is configured to receive signals from, and send signals to, a remote server, said apparatus configured to receive said user specific image from said remote server over a secure link; and
wherein
said user specific image comprises a user specific image fabricated by a user in conjunction with said remote server,
said apparatus is configured to service a plurality of users, said apparatus having access to a plurality of user specific images when operating in said secure domain, each of said plurality of user specific images corresponding to a different one of said plurality of users, said processor being configured to identify a present user and to indicate operation within said secure domain by displaying one of said plurality of user specific images corresponding to said present user on at least a portion of said display when operating within said secure domain, and
said apparatus is configured to display said one of said plurality of images corresponding to said present user on detection of said present user and before said present user inputs and confidential data.

2. An apparatus according to claim 1, wherein said processor comprises a plurality of domains including a secure domain and a non-secure domain, said processor when operating in said secure domain having access to at least one data item which is not accessible to said processor when operating in said non-secure domain, said user specific image comprising one of said at least one data item.

3. An apparatus for processing data according to claim 2, said apparatus comprising a memory, at least a portion of said memory not being accessible from said non-secure domain, said user specific image being stored in said portion of said memory not accessible from said non-secure domain.

4. An apparatus according to claim 1, wherein said user specific image comprises an image received over said secure link from said remote server where it is stored, said processor is arranged to indicate operation within said secure domain and connection to said remote server by display of said image.

5. An apparatus according to claim 1, said apparatus configured to display said user specific image as a background image on at least a portion of said display.

6. An apparatus according to claim 1, wherein said apparatus comprises a mobile telephone.

7. An apparatus according to claim 1, wherein said apparatus comprises a personal computer.

* * * * *